US012792802B2

(12) United States Patent
Yamashita et al.

(10) Patent No.: US 12,792,802 B2
(45) Date of Patent: Nov. 10, 2026

(54) SIMULATION METHOD, SIMULATION APPARATUS, FILM FORMING APPARATUS, ARTICLE MANUFACTURING METHOD AND NONTRANSITORY STORAGE MEDIUM

(71) Applicant: CANON KABUSHIKI KAISHA, Tokyo (JP)

(72) Inventors: Keiji Yamashita, Tochigi (JP); Sentaro Aihara, Tochigi (JP); Yuichiro Oguchi, Tokyo (JP); Ken Katsuta, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1097 days.

(21) Appl. No.: 17/587,283

(22) Filed: Jan. 28, 2022

(65) Prior Publication Data

US 2022/0261521 A1 Aug. 18, 2022

(30) Foreign Application Priority Data

Feb. 15, 2021 (JP) ................................ 2021-022043

(51) Int. Cl.
*G06F 30/28* (2020.01)
*G03F 7/00* (2006.01)
(Continued)

(52) U.S. Cl.
CPC ............ *G06F 30/28* (2020.01); *G03F 7/0002* (2013.01); *G06F 30/20* (2020.01); *G06F 2113/08* (2020.01); *G06F 2119/18* (2020.01)

(58) Field of Classification Search
CPC ...... G06F 30/28; G06F 30/20; G06F 2113/08; G06F 2119/18; G03F 7/0002
See application file for complete search history.

(56) References Cited

U.S. PATENT DOCUMENTS

| | | | | |
|---|---|---|---|---|
| 9,201,990 | B2 | 12/2015 | Wakamatsu | |
| 10,884,574 | B1 * | 1/2021 | Rueter | G06F 3/04812 |
| 2022/0035969 | A1 * | 2/2022 | Aihara | G06F 30/20 |

FOREIGN PATENT DOCUMENTS

| | | | | |
|---|---|---|---|---|
| EP | 3751344 | A1 * | 12/2020 | G03F 7/161 |
| JP | 2012212833 | A | 11/2012 | |

(Continued)

OTHER PUBLICATIONS

Ansys, "Ansys Fluent 18 Tutorial Guide", Jan. 2017, Ansys Inc., pp. 715-746 (Year: 2017).*

(Continued)

*Primary Examiner* — Emerson C Puente
*Assistant Examiner* — Emily Gorman Leathers
(74) *Attorney, Agent, or Firm* — ROSSI, KIMMS & McDOWELL LLP

(57) ABSTRACT

The invention provides a simulation method that predicts a behavior of a droplet of a curable composition in a process of bringing a plurality of droplets of the curable composition arranged on a first member into contact with a second member and forming a film made of the curable composition in a space between the first member and the second member, the method including obtaining, for each of the plurality of droplets of the curable composition, gas information, which includes at least the mole of a gas trapped in a closed region formed by adjacent droplets merging with each other, based on an evaluation value for evaluating a relationship related to a degree of merging between the adjacent droplets, and displaying the gas information, obtained in the obtaining, together with information indicating a state of the droplet corresponding to the gas information.

12 Claims, 10 Drawing Sheets

(51) Int. Cl.

| | |
|---|---|
| ***G06F 30/20*** | (2020.01) |
| ***G06F 113/08*** | (2020.01) |
| ***G06F 119/18*** | (2020.01) |

(56) References Cited

FOREIGN PATENT DOCUMENTS

| | | | |
|---|---|---|---|
| JP | 2013104751 | A | 5/2013 |
| JP | 5599356 | B2 | 10/2014 |
| JP | 2020123719 | A | 8/2020 |
| JP | 2020205416 | A | 12/2020 |

OTHER PUBLICATIONS

Mathworks, "Matlab Help Center—bubblechart—Documentation", Oct. 27, 2020, Mathworks.com, https://web.archive.org/web/20201027033104/https://www.mathworks.com/help/matlab/ref/bubblechart.html (Year: 2020).*

Jain, A., Spann, A., Bonnecaze, R., "Effect of droplet size, droplet placement, and gas dissolution on throughput and defect rate in UV nanoimprint lithography", 2017, Journal of Vacuum Science and Technology B, https://doi.org/10.1116/1.4971771 (Year: 2017).*

Li, D., Ma, X., Li, N., Hossein, R., Lu, W., Yu, Z., and Liang, X, "A Nanofluidics Study on Nanoscale Gas Bubble Defects in Dispensing-Based Nanoimprint Lithography", 2017, IEEE 17th International Conference on Nanotechnology, pp. 788-791, doi: 10.1109/NANO.2017.8117426 (Year: 2017).*

Sohn, K., "Numerical Simulation of Resin Flow and Mold Release in UV Nanoimprint Lithography Process", 2014, School of Mechanical and Aerospace Engineering—Seoul National University (Year: 2014).*

Jain, A., Spann, A., Cochrane, A., Schunk, p. and Bonnecase, R., "Fluid flow in UV nanoimprint lithography with patterned templates", 2017, Microelectronic Engineering 173, pp. 62-70 (Year: 2017).*

Criszalle, O., Soper, R., Mellichamp, D., and Seborg, D., "Adaptive control of photolithography", 1991, SPIE Col 1464 Integrated Circuit Metrology, Inspection, and Process Control V. (Year: 1991).*

* cited by examiner

SIMULATION METHOD, SIMULATION APPARATUS, FILM FORMING APPARATUS, ARTICLE MANUFACTURING METHOD AND NONTRANSITORY STORAGE MEDIUM

BACKGROUND OF THE INVENTION

Field of the Invention

The present invention relates to a simulation method, a simulation apparatus, a film forming apparatus, an article manufacturing method, and a non-transitory storage medium.

Description of the Related Art

As the demand for micropatterning of semiconductor elements, MEMS, and the like increases, a micropatterning technique that uses a mold to form an imprint material (curable composition) on a substrate and forms an imprint material composition on the substrate has gained attention in addition to a conventional photolithography technique. This micropatterning technique is also referred to as an imprint technique, and a fine pattern (structure) on the order of several nm can be formed on a substrate.

The imprint technique includes a photo-curing method as a method of curing an imprint material. In the photo-curing method, an imprint material arranged on a substrate is cured by being irradiated with light in a state in which the imprint material and a mold have been brought into contact with each other, and an imprint material pattern is formed on the substrate by separating the cured imprint material from the mold.

In such an imprint technique, the imprint material is arranged in the state of droplets on the substrate, and the mold is subsequently pressed onto the imprint material droplets. As a result, the imprint material droplets on the substrate will spread and form an imprint material film. At this time, it is important for the imprint material film to be formed so as to have a uniform thickness and not have air bubbles remaining in the film. To implement this, the arrangement of the droplets of the imprint material, the method and the conditions of pressing the mold onto the imprint material, and the like will be adjusted. An enormous amount of time and cost will be required to implement such adjustments by trial and error by using an apparatus. Hence, the development of a simulator that can support such adjustments is desired.

Japanese Patent No. 5599356 discloses a simulation method that uses a gas-liquid two-phase flow analysis to predict the wetting, the spreading, and the coalescence (merging of droplets) of a plurality of droplets arranged on a pattern forming surface, and a droplet arrangement pattern generation method using this simulation method.

In an imprint process, an air bubble (gas) trapped between the imprint material droplets may not disappear even at the point when the pressing of the mold has been completed, thus resulting in a defect due to an unfilled portion. Hence, it is necessary to grasp each air bubble trapped between imprint material droplets. Since the technique disclosed in Japanese Patent No. 5599356 only considers the wetting and the spreading of the droplets on a plane and does not consider the height, it cannot grasp physical quantities such as the pressure and the volume of an air bubble trapped between the imprint material droplets. Physical quantities such as the pressure and the volume of the air bubble trapped between the imprint material droplets are pieces of information necessary for grasping the time required for the air bubble to disappear.

SUMMARY OF THE INVENTION

The present invention provides a technique advantageous in grasping a gas trapped between droplets of a curable composition by predicting the behavior of the droplets of the curable composition in a process for forming a film made of the curable composition.

According to one aspect of the present invention, there is provided a simulation method that predicts a behavior of a droplet of a curable composition in a process of bringing a plurality of droplets of the curable composition arranged on a first member into contact with a second member and forming a film made of the curable composition in a space between the first member and the second member, the method including obtaining, for each of the plurality of droplets of the curable composition, gas information, which includes at least the mole of a gas trapped in a closed region formed by adjacent droplets merging with each other, based on an evaluation value for evaluating a relationship related to a degree of merging between the adjacent droplets, and displaying the gas information, obtained in the obtaining, together with information indicating a state of the droplet corresponding to the gas information.

Further aspects of the present invention will become apparent from the following description of exemplary embodiments with reference to the attached drawings.

DESCRIPTION OF THE EMBODIMENTS

Figure 1:
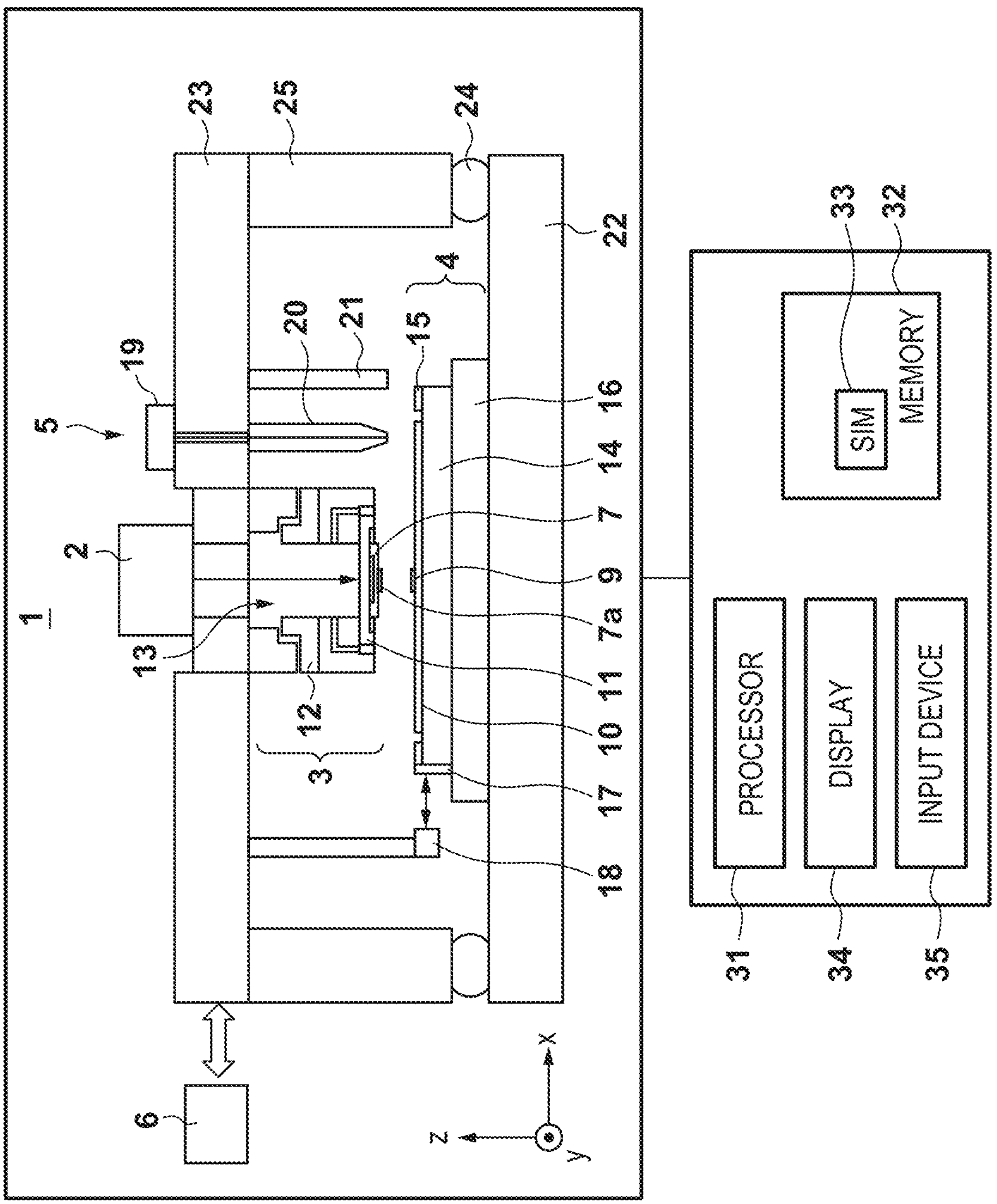
FIG. 1 is a schematic view showing the arrangements of a film forming apparatus and a simulation apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a schematic view showing the arrangements of a film forming apparatus 1 and a simulation apparatus 30 according to an embodiment of the present invention. The film forming apparatus 1 executes a process of bringing a plurality of droplets of a curable composition 9 arranged on a substrate 10 into contact with a mold 7 (original, template) and forming a film of the curable composition 9 in a space between the substrate 10 and the mold 7. The film forming apparatus 1 is formed as, in the embodiment, an imprint apparatus, but may be formed as a planarization apparatus. The substrate 10 and the mold 7 are interchangeable, and a film of the curable composition 9 may be formed in the space between the mold 7 and the substrate 10 by bringing a plurality of droplets of the curable composition 9 arranged on the mold 7 into contact with the substrate 10. Therefore, the film forming apparatus 1 is comprehensively an apparatus that executes a process of bringing a plurality of droplets of the curable composition 9 arranged on the first member into contact with the second member and forming a film of the curable composition 9 in a space between the first member and the second member. This embodiment provides a description by assuming the first member as the substrate 10 and the second member as the mold 7. However, the first member may be assumed as the mold 7 and the second member may be assumed as the substrate 10. In this case, the substrate 10 and the mold 7 in the following description are interchanged.

The film forming apparatus 1 configured as an imprint apparatus uses the mold 7 having a pattern to transfer the pattern of the mold 7 to the curable composition 9 on the substrate 10. As an imprint process, the film forming apparatus 1 uses the mold 7 having a pattern region 7*a* provided with a pattern. The film forming apparatus 1 brings the curable composition 9 on the substrate 10 into contact with the pattern region 7*a* of the mold 7, fills, with the curable composition 9, a space between the mold 7 and a region where the pattern of the substrate 10 is to be formed, and then cures the curable composition 9. This transfers the pattern of the pattern region 7*a* of the mold 7 to the curable composition 9 on the substrate 10. For example, the film forming apparatus 1 forms a pattern made of a cured product of the curable composition 9 in each of a plurality of shot regions of the substrate 10.

As a planarization process, using the mold having a flat surface, the planarization apparatus brings the curable composition on the substrate into contact with the flat surface of the mold, and cures the curable composition, thereby forming a film having a flat upper surface. If the mold having dimensions (size) that cover the entire region of the substrate is used, the planarization apparatus forms a film made of a cured product of the curable composition on the entire region of the substrate.

As the curable composition, a material to be cured by receiving curing energy is used. As the curing energy, an electromagnetic wave or heat can be used. The electromagnetic wave includes, for example, light selected from the wavelength range of 10 nm (inclusive) to 1 mm (inclusive) and, more specifically, infrared light, a visible light beam, or ultraviolet light. The curable composition is a composition cured by light irradiation or heating.

A photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component.

The imprint material may be applied, onto the substrate, in a droplet shape or in an island or film shape formed by connecting a plurality of droplets using a liquid injection head. The viscosity (the viscosity at 25° C.) of the curable composition is, for example, 1 mPa·s (inclusive) to 100 mPa·s (inclusive).

As the material of the substrate, for example, glass, a ceramic, a metal, a semiconductor, a resin, or the like is used. A member made of a material different from the substrate may be provided on the surface of the substrate, as needed. The substrate includes, for example, a silicon wafer, a compound semiconductor wafer, or silica glass.

In the specification and the accompanying drawings, directions will be indicated on an XYZ coordinate system in which directions parallel to the surface of the substrate 10 are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information that is specified based on coordinates on the X-, Y-, and Z-axes, and an orientation is information that is specified by values on the θX-, θY-, and θZ-axes. Positioning means controlling the position and/or orientation.

In this embodiment, it will be assumed that the film forming apparatus 1 will employ a photo-curing method in which the curable composition 9 is cured by light irradiation. The film forming apparatus 1 includes an irradiation unit 2, a mold holding unit 3, a substrate holding unit 4, a supplying unit 5, a control unit 6, and an alignment measurement unit 21. The film forming apparatus 1 also includes a plate 22 that specifies a reference plane on which the substrate holding unit 4 is placed, a bridge plate 23 that fixes the mold holding unit 3, anti-vibration devices 24 that eliminate the vibration from the floor, and columns 25 that support the bridge plate 23 via the corresponding anti-vibration devices 24. In addition, the film forming apparatus 1 also includes a mold conveyance unit (not shown) that conveys the mold 7 between the outside of the apparatus and the mold holding unit 3 and a substrate conveyance unit that conveys the substrate 10 between the outside of the apparatus and the substrate holding unit 4.

The mold holding unit 3 includes a mold chuck 11 that chucks and holds the mold 7 by a vacuum suction force or an electrostatic force and a mold driving mechanism 12 that drives the mold 7 (the mold chuck 11) while holding the mold chuck 11. The mold chuck 11 and the mold driving mechanism 12 each include an opening in a center portion (inside) so as to allow the light from the irradiation unit 2 to irradiate the curable composition 9 on the substrate 10. The mold driving mechanism 12 will drive the mold 7 in the Z direction to selectively press (imprint) the mold 7 onto the curable composition 9 on the substrate 10 or separate (release) the mold 7 from the curable composition 9 on the substrate 10. An actuator which is applicable to the mold driving mechanism 12 will include, for example, a linear motor or an air cylinder. The mold driving mechanism 12 may be formed from a plurality of driving systems such as a coarse driving system, a fine driving system, and the like to allow accurate positioning of the mold 7. In addition, the mold driving mechanism 12 may be formed to be able to drive the mold 7 not only in the Z direction but also in the X direction and the Y direction. Furthermore, the mold driving mechanism 12 may be formed to have a tilt function to allow adjustment of the position of the mold 7 in the 0 (rotation about the Z-axis) direction and the tilt of the mold 7.

The mold 7 has a rectangular peripheral shape and includes the pattern region 7*a* that includes a pattern (an uneven pattern such as a circuit pattern or the like to be transferred to the substrate 10) formed three-dimensionally on a surface which faces the substrate 10. The mold 7 is made of a material, for example, quartz, which can transmit light. In addition, the mold 7 may have, on a surface to be irradiated, a cavity which has a circular plane shape and some depth.

In an imprint process, the irradiation unit 2 irradiates the curable composition 9 on the substrate 10 via the mold 7 with light (for example, ultraviolet light). The irradiation unit 2 includes a light source (not shown) and an optical system 13 (a lens, a mirror, a light-shielding plate, and the like) for adjusting the light from the light source into an appropriate state (the light intensity distribution, the irradiation region, and the like) for the imprint process. Since the photo-curing method is employed in this embodiment, the film forming apparatus 1 includes the irradiation unit 2. However, in a case in which a heat curing method is to be employed, the film forming apparatus 1 will include, instead of the irradiation unit 2, a heat source for curing a heat-curing composition.

The substrate holding unit 4 includes a substrate chuck 14 that chucks and holds the substrate 10 by a vacuum chucking force or an electrostatic force, a substrate driving mechanism 16 that drives the substrate 10 (the substrate chuck 14) by holding the substrate chuck 14, and an auxiliary member 15. Note that the substrate chuck 14 and the substrate driving mechanism 16 form a substrate stage that can be driven in the XY plane.

The auxiliary member 15 is arranged in the periphery of the substrate chuck 14 so as to surround the substrate 10 held by the substrate chuck 14. The auxiliary member 15 is also arranged on the substrate driving mechanism 16 so that the upper surface of the auxiliary member 15 and the upper surface of the substrate 10 held by the substrate chuck 14 will be approximately flush. For example, the different between the height of the upper surface of the auxiliary member 15 and the height of the substrate 10 held by the substrate chuck 14 can be 1 mm or less or, more preferably, 0.1 mm or less.

The position of the mold 7 and the position of the substrate 10 can be adjusted (aligned) with respect to each other by adjusting the position of the substrate holding unit 4 when the pattern region 7*a* of the mold 7 is to be pressed onto the curable composition 9 on the substrate 10. An actuator which is applicable to the substrate driving mechanism 16 will include, for example, a linear motor or an air cylinder. The substrate driving mechanism 16 may be formed to be able to drive the substrate 10 not only in the X direction and the Y direction but also in the Z direction. In addition, the substrate driving mechanism 16 may be formed to have a tilt function for adjusting the position of the substrate 10 in the θ (the rotation about the Z-axis) direction and the tilt of the substrate 10.

In this embodiment, the pressing and the releasing of the mold 7 are implemented by driving the mold 7 in the Z direction. However, the pressing and the releasing of the mold 7 may also be implemented by driving the substrate 10 in the Z direction or by driving both the mold 7 and the substrate 10 relatively in the Z direction.

The substrate holding unit 4 includes, on its side surface, a plurality of reference mirrors 17 corresponding to the respective X, Y, Z, ωx, ωy, and ωz directions. A plurality of laser interferometers 18, each of which is formed to measure the substrate holding unit 4 by irradiating a corresponding one of the reference mirror 17 with a laser beam such as helium neon, are arranged. Note that only one set of the reference mirror 17 and the laser interferometer 18 is shown in FIG. 1. The laser interferometer 18 measures, for example, the position of the substrate holding unit 4 in real time. The substrate 10 (substrate holding unit 4) is positioned based on the measurement result of the laser interferometers 18. Note that an encoder may be used instead of each laser interferometer 18 to measure the position of the substrate holding unit 4.

The supplying unit 5 is arranged near the mold holding unit 3 and has a function of arranging (supplying) droplets of the curable composition 9 on (the shot region of) the substrate 10. In this embodiment, the supplying unit 5 employs the inkjet method, and includes a container 19 for storing the uncured curable composition 9 and a discharge unit 20 for discharging the droplets of the curable composition 9 which is stored in the container 19.

The internal atmosphere of the container 19 is set to be an atmosphere which will not cause a curing reaction in the curable composition 9, for example, an atmosphere containing oxygen, and will allow the curable composition 9 to be managed. In addition, the container 19 is made of a material which will prevent particles or chemical impurities from mixing into the curable composition 9.

The discharge unit 20 includes, for example, a piezoelectric discharging mechanism (inkjet head) which includes a plurality of orifices. The amount (discharge amount) of the curable composition 9 to be discharged from the discharge unit 20 can be adjusted within the range of 0.1 pL/droplet to 10 pL/droplet, and is normally set to be about 1 pL/droplet. Note that the entire supply of the curable composition 9 is determined in accordance with the density of the pattern of the mold 7 or the remaining film thickness.

The alignment measurement unit 21 measures the position of the substrate 10 by detecting the alignment marks provided on the substrate 10.

The control unit 6 is formed by a computer including a CPU, a memory, and the like, and causes the film forming apparatus 1 to operate by comprehensively controlling the respective units of the film forming apparatus 1 in accordance with programs stored in a storage unit. For example, the control unit 6 will control an imprint process to form an imprint material pattern made of the curable composition 9 on the substrate by using the mold 7. The control unit 6 may be integrally formed (within a common housing) with other parts of the film forming apparatus 1 or may be formed separately (in another housing) from the other parts of the film forming apparatus 1.

An imprint process to be performed by the film forming apparatus 1 will be described here. In an imprint process, first, the curable composition 9 on a substrate is arranged (supplied) by using the supplying unit 5 (supplying process). Next, the mold driving mechanism 12 is used to bring the curable composition 9 on the substrate and the mold 7 into contact with each other and to press the pattern region 7*a* of the mold 7 onto the curable composition 9 on the substrate (contacting process). Next, in a state in which the curable composition 9 on the substrate and the mold 7 are in contact with each other, the curable composition 9 is irradiated via mold 7 with the light from the irradiation unit 2, and the curable composition 9 on the substrate is cured (curing process). Subsequently, the mold driving mechanism 12 is used to separate the cured curable composition 9 on the substrate from the mold 7 (mold releasing process). As a result, a pattern (film) made of the curable composition 9 which has been three-dimensionally shaped in accordance with the pattern of the mold 7 is formed on the substrate 10. Such series of processes will be performed on each of the plurality of shot regions on the substrate.

Note that if the air present between the mold 7 and the substrate 10 gets into the pattern of the mold 7 when the curable composition 9 on the substrate and the mold 7 are to be brought into contact to fill the pattern of the mold 7 with the curable composition 9, a defect due to an unfilled portion will be generated in the pattern of the curable composition 9 formed on the substrate. Hence, it is preferable to supply the space between the mold 7 and the substrate 10 with a gas which has at least one of the properties of high solubility and high diffusivity with respect to the curable composition 9.

The simulation apparatus 30 executes computation of predicting the behavior of the curable composition 9 in a process executed by the film forming apparatus 1. More specifically, the simulation apparatus 30 executes computation of predicting the behavior of the curable composition 9 in the process of bringing the plurality of droplets of the curable composition 9 arranged on the substrate 10 into contact with the mold 7 and forming a film of the curable composition 9 in the space between the substrate 10 and the mold 7.

The simulation apparatus 30 is formed by, for example, incorporating a simulation program 33 in a general-purpose or dedicated computer. Note that the simulation apparatus 30 may be formed by a PLD (Programmable Logic Device) such as an FPGA (Field Programmable Gate Array). Alternatively, the simulation apparatus 30 may be formed by an ASIC (Application Specific Integrated Circuit).

In this embodiment, the simulation apparatus 30 is formed by storing the simulation program 33 in a memory 32 in a computer including a processor 31, the memory 32, a display 34 and an input device 35. The memory 32 may be a semiconductor memory, a disk such as a hard disk, or a memory of another form. The simulation program 33 may be stored in a computer-readable memory medium or provided to the simulation apparatus 30 via a communication facility such as a telecommunication network.

The simulation method and the simulation apparatus of the present invention are related to the simulation of the behavior of a curable composition in a process, that is, an imprint process, of forming a curable composition film in a space between a substrate and a mold. More specifically, the simulation method and the simulation apparatus of the present invention will predict and visually display the spreading of droplets in an arbitrary time by simulating the spreading of droplets including the interaction between the droplets of the curable composition on the substrate. The simulation method and the simulation apparatus of the present invention will also obtain and visually display the physical quantities of a gas, that is, a gas (air bubble) which is trapped between the droplets due to the merged state or a change in the merged state of the droplets of the curable composition on the substrate. The physical quantities of the gas are pieces of gas information including at least the mole of the gas, and including, more specifically, at least one of the volume, the pressure, and the concentration of the gas in addition to the mole of the gas. This will allow the behavior (state) of the spreading of the droplets of the curable composition on the substrate to be visually confirmed as well as each location where a defect due to an unfilled portion may be generated to be predicted (grasped) from a physical quantity distribution of the gas trapped between the droplets. By adjusting the arrangement of the droplets of the curable composition on the substrate based on such information, it will be possible to suppress the defect due to an unfilled portion without actually performing an imprint process. Note that the mole corresponds to n when PV=nRT as an equation of state when P, V, n, R, and T represent the pressure, the volume, the mass, the gas constant, and the temperature, respectively, of an ideal gas. Assume that the mole represents the quantity of the gas (gas quantity) in this embodiment.

Figure 2:
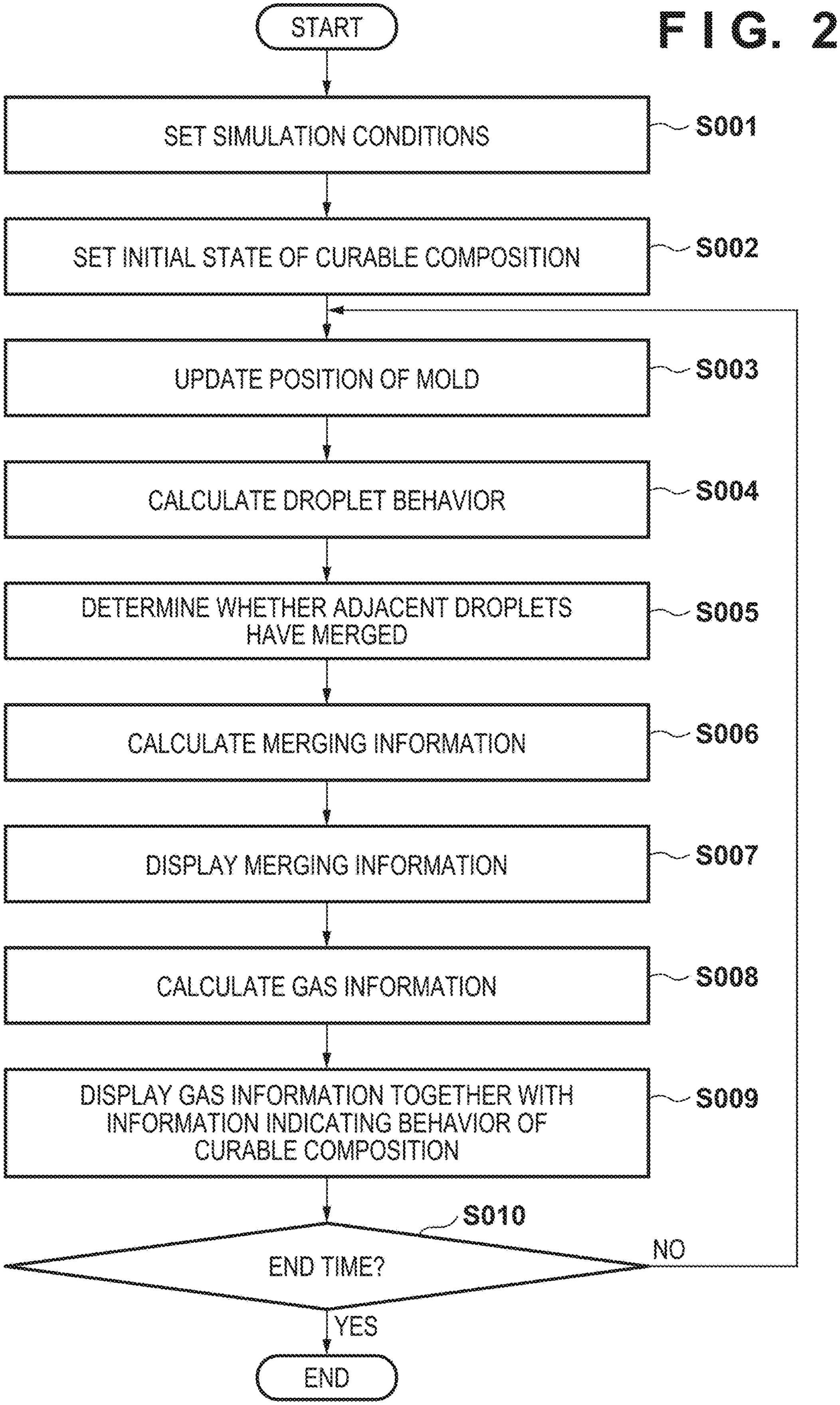
FIG. 2 is a flowchart for describing the simulation method according to the embodiment of the present invention.

A simulation method to be executed by the simulation apparatus 30 will be described in detail below with reference to FIG. 2. The simulation method includes, as processes, steps S001, S002, S003, S004, S005, S006, S007, S008, S009, and S010. The simulation apparatus 30 can be understood to be an aggregate of hardware elements which execute the processes of the simulation method shown in FIG. 2.

Step S001 is a process of setting conditions (simulation conditions) necessary for a simulation. Step S002 is a process of setting the initial state of the curable composition 9 based on the simulation conditions set in step S001. The processes of steps S001 and S002 may also be understood as a single integrated process, for example, a preparation process. Step S003 is a process of calculating the movement of the mold 7 and updating (calculating) the position of the mold 7 (the distance between the substrate 10 and the mold 7). Step S004 is a process of calculating, based on the position of the mold 7 updated in step S003, the behavior of each droplet (the flow of each droplet) spread out by the mold 7 for each of the plurality of droplets of the curable composition 9. Step S005 is a process of determining, based on the behavior of each droplet calculated in step S004, whether adjacent droplets have merged together among the plurality of droplets of the curable composition 9. Step S006 is a process of calculating, for each of the droplets of the curable composition 9, merging information based on information as to whether each droplet has merged with each adjacent droplet determined in step S004. Step S007 is a process of displaying the merging information calculated in step S006. In step S007, the merging information calculated in step S006 may be displayed together with the pieces of information indicating the states of the plurality of droplets of the curable composition 9 (the behavior of the curable composition 9). Step S008 is a process of calculating, based on the merging information calculated in step S006, gas information which includes at least the mole of the gas trapped between the droplets of the curable composition 9 (each closed region formed by the merging of mutually adjacent droplets). In step S009, the gas information calculated in step S008 is displayed together with the information indicating the state of the plurality of droplets of the curable composition 9 (the behavior of the curable composition 9). Step S010 is a process of determining whether the time of the calculation (simulation) has reached the end time. If the time of the calculation has not reached the end time, the time is advanced to the next time and the process shifts to step S003. On the other hand, if the time of the calculation has reached the end time, the simulation ends.

Each process of the simulation method shown in FIG. 2 will be described in detail hereinafter.

In step S001, various kinds of parameters are set as conditions necessary for a simulation. The parameters include the arrangement of the droplets of the curable composition 9 on the substrate 10, the volume of each droplet, the physical property values of the curable composition 9, information related to the unevenness of the surface of the mold 7 (for example, information of the pattern of the pattern region 7*a*), information related to the unevenness of the surface of the substrate 10, and the like. The parameters also include conditions (pressing conditions) to be set when the mold 7 is to be brought into contact with the curable composition 9 on the substrate, more specifically, the warping pressure on the mold 7, the speed and the force when the mold 7 is to brought into contact with the curable composition 9 on the substrate, and the like. Furthermore, the parameters include the type and the quantity of the gas to be supplied to the space between the mold 7 and the substrate 10 when the mold 7 is to be brought into contact with the curable composition 9 on the substrate.

In step S002, the initial state (the state of each droplet when the simulation is to be started) of each of the plurality of droplets of the curable composition 9 is set. The initial state includes the contour (of the shape) and the height of each droplet when each droplet of the curable composition 9 arranged on the substrate 10 has wetted and spread. The initial state can also be calculated by assuming as state of static equilibrium by using the physical property values of the curable composition 9. Alternatively, the initial state can be calculated from the dynamic wetting and spreading behavior of the curable composition by executing a general flow simulation by inputting, in addition to the physical property values of the curable composition 9, the elapsed time since the droplets of the curable composition 9 have been arranged on the substrate 10 and the like.

Figure 3:
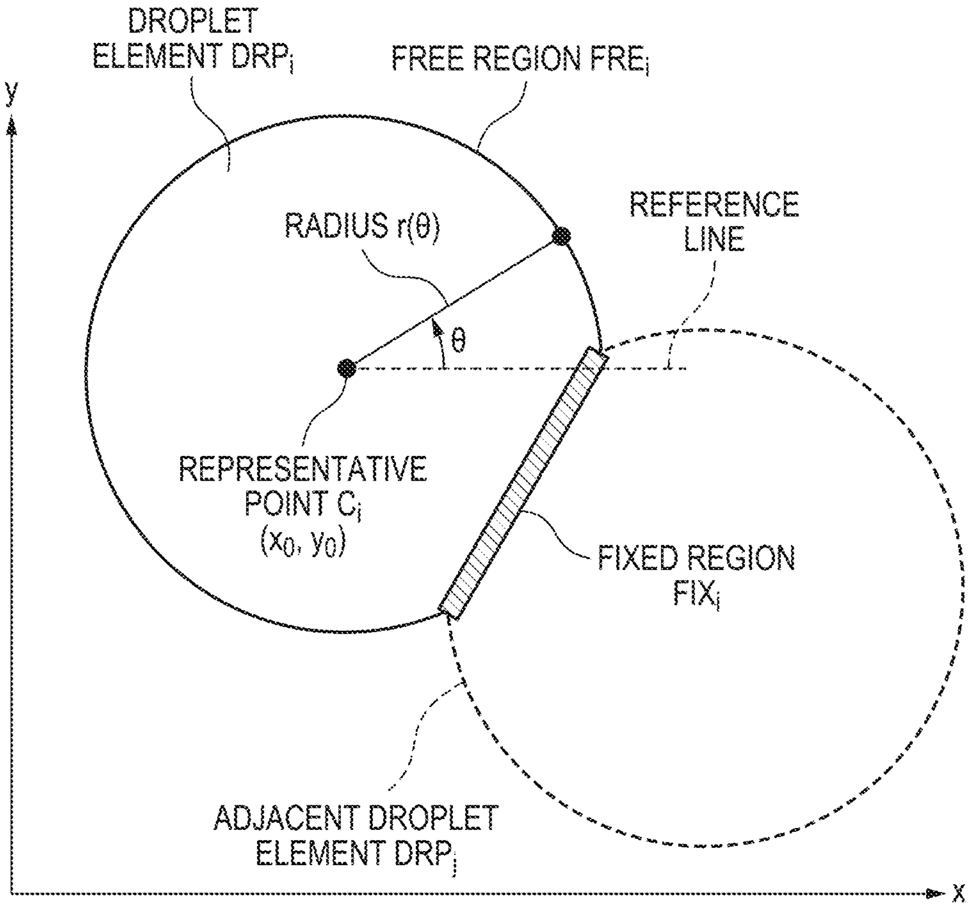
FIG. 3 is a view showing the concept of droplet elements of a curable composition.

In the simulation model according to this embodiment, each droplet of the curable composition 9 is modeled as a droplet element DRP as shown in FIG. 3. FIG. 3 is a view showing the concept of the droplet element DRP of the curable composition 9. As shown in FIG. 3, assume that $DRP_i$ indicates an ith droplet element and the lower subscript i represents the number of the droplet element DRP.

First, a representative point is set in each droplet element of the curable composition 9. Assume that Ci(x0, y0) is the coordinates of the representative point. The representative point of each droplet of the curable composition 9 may be the center of gravity of the droplet or a point (position) different from the center of gravity of the droplet, but needs to be set inside of the contour of the droplet. In addition, a distance seen from the representative point of the droplet element of the curable composition 9 to a point on the contour (on the periphery) of the droplet element which is at a position of an angle θ (an angle formed by a reference line and a line connecting the representative point with the point on the contour of the droplet) represents a radius r(θ). The value of the radius r(θ) changes in accordance with each angle θ. Information that indicates whether each point on the contour of the droplet element has merged with (penetrated) an adjacent droplet element will also be held here. The position (the radius r(θ)) of each point on the contour which has merged with an adjacent droplet element will be fixed at that point of time. In this manner, a region of the angle θ with the fixed radius r(θ) will be set as a fixed region FIX, as indicated by slashed lines in FIG. 3. On the other hand, a region of the angle θ without the fixed radius r(θ) will be set as a free region $FRE_i$ as indicated by a solid line in FIG. 3. In the initial state of each droplet of the curable composition 9, every angle θ will belong to the free region.

Figure 6:
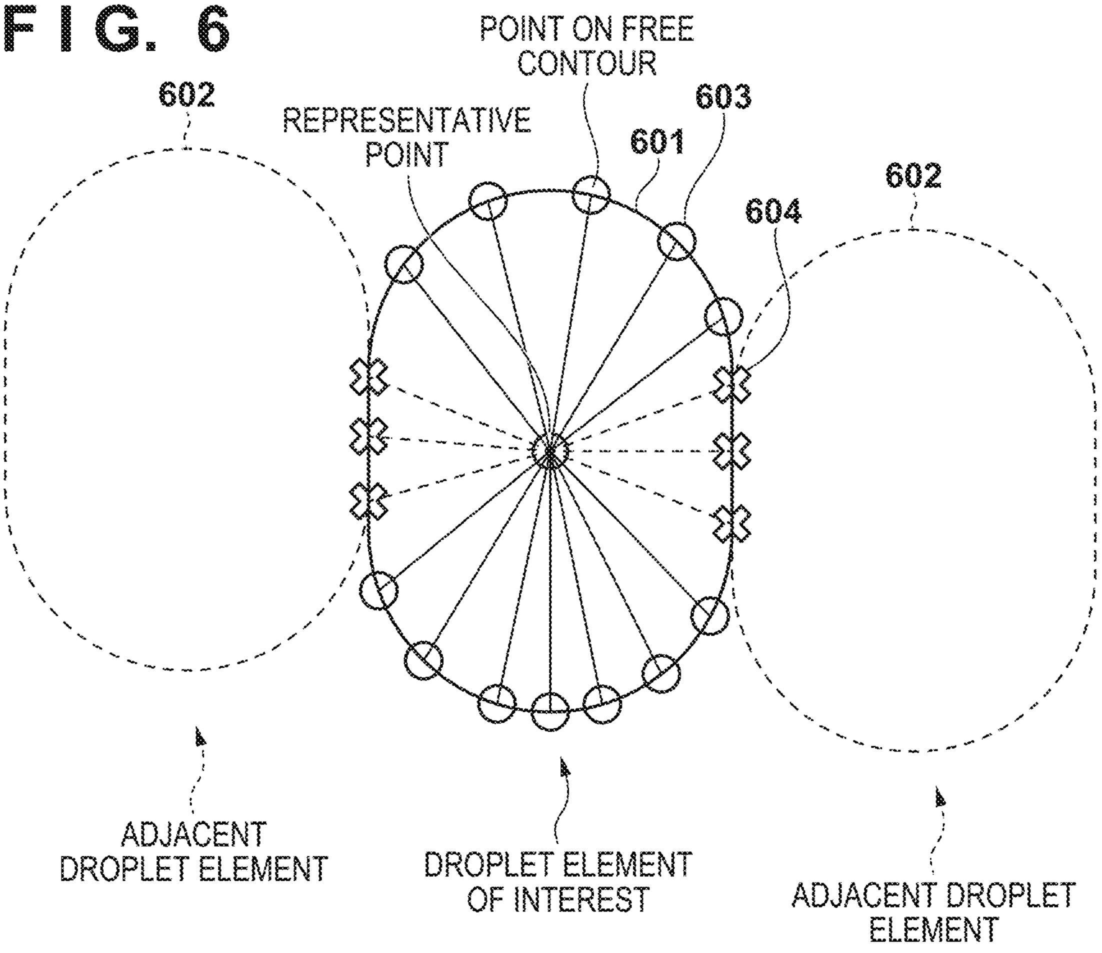
FIG. 6 is a view showing the droplet elements of the curable composition defined by 18 angles.

In a case in which the simulation method according to this embodiment is to be implemented as an actual program, the angle θ may be handled by being finitely divided (that is, a finite number of points will be set on the contour of each droplet to define the contour of the droplet). FIG. 6 is a view showing a droplet element of the curable composition 9 which has been defined (divided) by 18 angles θ (angles θ1 to θ18). In this case, each angle θ may be set by equally dividing 360° or set to an arbitrary angle. An arbitrary interpolation can be applied when obtaining the contour between adjacent points on the contour expressed by the finite number of points. For example, the adjacent points on the contour may be connected by a line or a higher-order interpolation may be applied.

In step S003, the movement of the mold 7 is calculated, and the position of the mold 7 is updated. The movement of the mold 7 is calculated by computational mechanics considering the force generated when the droplets of the curable composition 9 or the liquid film formed by the droplets merging with each other is pressed and crushed, the force due to the flow of a gas in the space between the mold 7 and the substrate 10, the load applied to the mold 7, the influence of elastic deformation of the mold 7, and the like.

In step S004, the behavior of each droplet element DRP spread out by the mold 7 is calculated. Step S004 includes a process of determining whether each droplet element DRP is in contact with the mold 7. A height $h_{drp,i}$ of the droplet element $DRP_i$ obtained in step S002 and a distance $h_i$ between the mold 7 and the substrate 10 at the representative point Ci (x0, y0) of the droplet element $DRP_i$ are compared, and the droplet element $DRP_i$ will be determined to be in contact with the mold 7 when $$h_{drp,i} \leq h_i \quad (1)$$

On the other hand, if equation (1) is not satisfied, it will be determined that the droplet element $DRP_i$ is not in contact with the mold 7 at the current time of the calculation. In such a case, the calculation of the behavior of the droplet element $DRP_i$ will not be performed.

The behavior of each droplet element $DRP_i$ which has been determined to be in contact with the mold 7 and has been spread out by the movement of the mold 7 is calculated. In this process, the volume of each droplet of the curable composition 9 will be stored (maintained). Hence, by using a volume $V_i$ of the droplet element $DRP_i$ and the distance $h_i$ of the droplet element position at the current time, an area $S^{new}$ of the droplet element $DRP_i$ at the current time can be expressed as $$S^{new} = \frac{V_i}{h_i} \quad (2)$$

In step S005, whether the adjacent droplet elements have merged is determined. As a result of calculating the contour of each droplet element in step S004, a state in which a point on the contour having the angle θ belonging to the free region $FRE_i$ enter inside (inside of the contour) an adjacent droplet element will occur. In this case, the radius r(θ) of the angle θ will be fixed (that is, the distance from the representative point to the point on the contour corresponding to the merged portion of the droplets will be fixed). In other words, the angle θ will be included in the fixed region FIX', and the spreading (flowing) of the droplet element of the curable composition 9 will not occur in the direction of the angle θ in times thereafter. In step S005, whether the droplets have merged with each other is determined for every set of droplet elements as described above.

Figure 4:
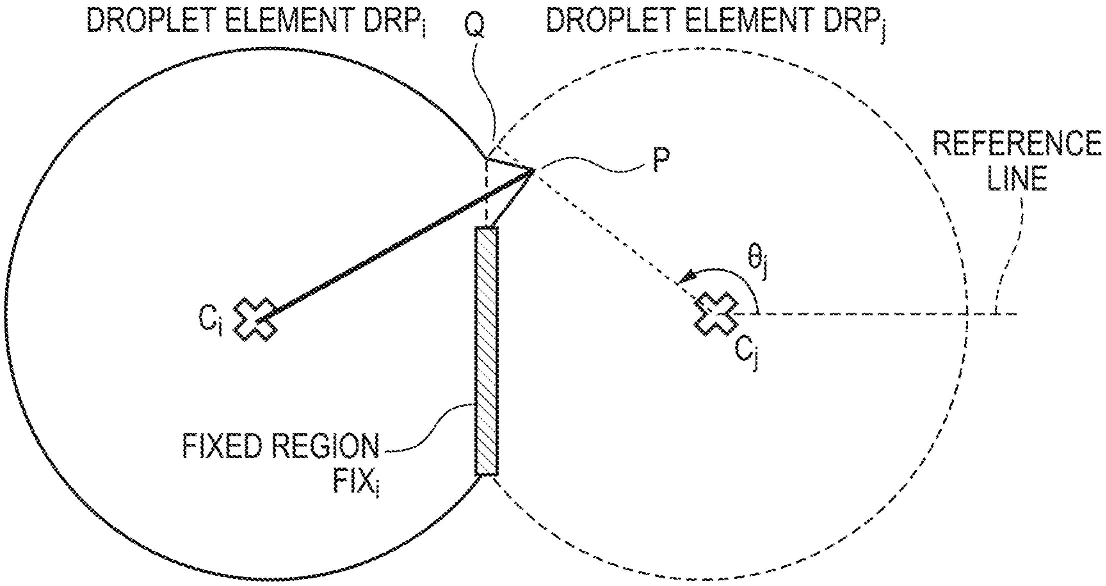
FIG. 4 is a view for describing processing for determining whether adjacent droplet elements have merged.

Processing for determining whether adjacent droplet elements have merged, that is, whether a point on the contour of a droplet is positioned inside of the contour of an adjacent droplet will be described with reference to FIG. 4. First, attention will be paid to the droplet element $DRP_i$ to consider a point P on the contour in an angle direction belonging to the free region $FRE_i$ of the droplet element $DRP_i$. A droplet element DRP will be assumed to represent a droplet element adjacent to the droplet element $DRP_i$, and the length of a line segment $PC_j$ connecting the point P and a representative point $C_j$ (center) of the droplet element DRP will be obtained. In addition, an angle $\theta_j$ formed by the line segment $PC_j$ and a reference line of the droplet element DRP will be obtained, and the length of a radius $QC_j$ of the droplet element DRP at the angle $\theta_j$ will be obtained. Subsequently, the length of the radius $QC_j$ and the length of the line segment $PC_j$ will be compared. If the length of the radius $QC_j$ is longer the length of the line segment $PC_j$, it will be determined that the point P on the contour of the droplet element $DRP_i$ is positioned inside the contour of the adjacent droplet element DRP, that is, this set of adjacent droplet elements have merged. On the other hand, if the length of the radius $QC_j$ is shorter the length of the line segment $PC_j$, it will be determined that the point P on the contour of the droplet element $DRP_i$ is not positioned inside the contour of the adjacent droplet element DRP, that is, this set of adjacent droplet elements have not merged. Note although it has been illustrated as if the point P on the contour of the droplet element $DRP_i$ has greatly penetrated inside the adjacent droplet element DRP in FIG. 4, the illustration is merely emphasizing the characteristic of the embodiment. In an actual calculation, the time interval can be sufficiently shortened to set the penetration amount by which the point P on the contour of the droplet element $DRP_i$ will penetrate inside the adjacent droplet element DRP to an ignorable size.

Figure 5:
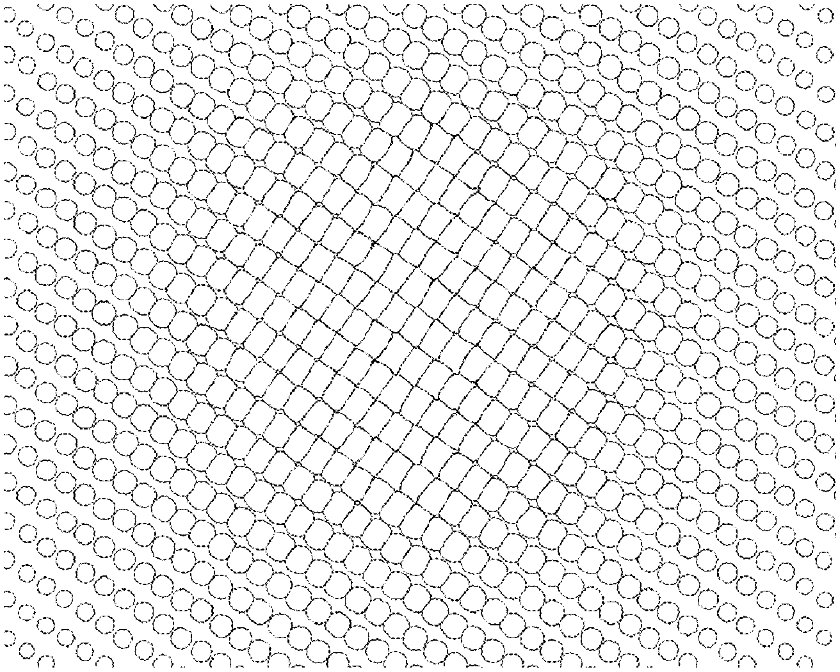
FIG. 5 is a view showing an example of the behavior of the droplets of the curable composition calculated by the simulation apparatus shown in FIG. 1.

FIG. 5 is a view showing an example in which the simulation apparatus 30 implementing the simulation method according to this embodiment has calculated the behavior (spreading) of the droplets of the curable composition 9. The distance between the mold 7 and the substrate 10 decreases as the center of FIG. 5 becomes closer and increases as the center of FIG. 5 becomes farther. Referring to FIG. 5, it can be seen that a complex state of merging between the droplets can be expressed in accordance with the arrangement of the droplets of the curable composition 9 on the substrate 10.

In step S006, the result of the determination as to whether adjacent droplet elements have merged is used to calculate the merging information. The merging information represents an evaluation value for evaluating a relationship related to the degree of merging with an adjacent droplet. For example, in this embodiment, assume that the merging information is information that indicates how much a portion of the contour of each droplet of the curable composition 9 is in contact with the contour of another droplet. More specifically, assume that the merging information is the ratio of the portion determined to be in contact with the contour of the adjacent droplet to the length of the contour of the droplet of the curable composition 9, that is, the ratio of the portion in contact with the contour of the adjacent droplet to the entire contour of the droplet. In this case, the contour of the droplet of the curable composition 9 may be divided by a plurality of angles, and a ratio of angles determined to be in contact with the other droplet to the plurality of angles of the droplet may be set as the merging information.

The concept of the ratio of merging with an adjacent droplet to the length of the contour of a droplet of the curable composition 9, that is, the merging information according to this embodiment will be described with reference to FIG. 6. In FIG. 6, reference numeral 601 indicates the contour of a droplet element of interest, and reference numeral 602 indicates the contour of each droplet adjacent to the droplet of interest. A plurality of points 603 of the contour 601 of the droplet element of interest are sampled, and whether each of the plurality of points 603 is in contact with the contour 602 of a corresponding adjacent droplet element is determined. For example, of the plurality of points 603, each point 604 is a point determined to be in contact with the contour 602 of the corresponding adjacent droplet element. Ultimately, the ratio of the points 604 in contact with the contours 602 of the adjacent droplet elements to the entire number of the points 603 sampled on the contour 601 of the droplet element of interest will be set as the merging information.

Figure 7:
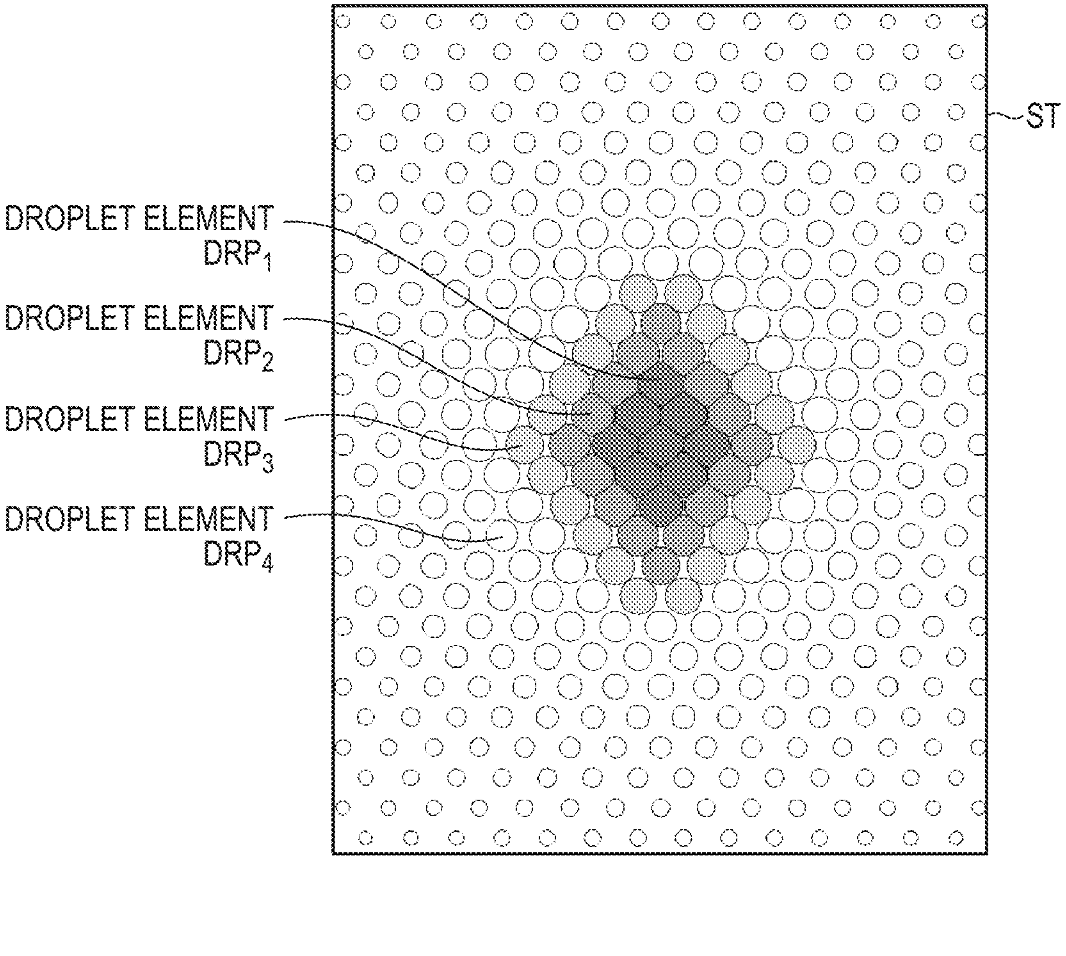
FIG. 7 is a view showing an example of an image which is to be displayed on a display.

In step S007, the merging information obtained in this manner is displayed on the display 34 together with, for example, the information showing the state (of the spreading) of each droplet of the curable composition 9 corresponding to the merging information. FIG. 7 is a view showing an example of an image including the merging information to be displayed on the display 34 in step S007. In FIG. 7, the merging information is displayed in color with respect to the distribution of each droplet element $DRP_i$ arranged in a shot region ST of the substrate 10. In this embodiment, the color within a region of each droplet element $DRP_i$ is changed in accordance with the ratio of the merging of the corresponding adjacent droplet to the length of the contour of the droplet element $DRP_i$.

A case in which the mold 7 is deformed into a convex shape towards the substrate 10 when the mold 7 is to be brought into contact with the curable composition 9 on the substrate 10 will be considered. In this case, the droplet elements $DRP_i$ will spread out sequentially from each droplet element $DRP_i$ arranged at the center of the shot region ST to each droplet element $DRP_i$ arranged on the peripheral side of the shot region ST. Hence, each droplet element $DRP_i$ arranged at the center of the shot region ST tends to have a higher ratio of merging with each adjacent droplet element than each droplet element $DRP_i$ arranged on the peripheral side of the ST. In FIG. 7, the density within the region of each droplet element $DRP_i$ has been changed in accordance with the ratio of the merging with each adjacent droplet in accordance with each droplet element $DRP_i$, and a region of each droplet element $DRP_i$ with a higher ratio of merging with each adjacent droplet is displayed with a darker color. More specifically, it is arranged so that the respective regions of droplet elements $DRP_1$, droplet elements $DRP_2$, and droplet elements $DRP_3$ will be displayed in lighter colors sequentially, that is, in order as the distance from the center of the shot region ST increases. In addition, if a droplet element is not in contact with an adjacent droplet in the manner of each droplet element $DRP_4$, the region of such a droplet element is displayed in white. Note that the boundary between each droplet element $DRP_i$ and each corresponding adjacent droplet element will also be able to be confirmed by using different colors to discriminate and (identifiably) display the region of each droplet element $DRP_i$ and the contour of each droplet element $DRP_i$.

This embodiment has described a case in which the density of the region of each droplet corresponding to a piece of merging information is changed in accordance with the magnitude of this piece of merging information. However, the present invention is not limited to this. For example, the hue of the region of each droplet corresponding to a piece of merging information may be changed in accordance with the magnitude of this piece of merging information. In addition, the merging information can also be numerically grasped by displaying a legend in which each color representing the magnitude of the merging information has been associated with the magnitude relationship of the merging information (the ratio of the merging with an adjacent droplet in this embodiment) indicated by the color. As a result, it will be possible to visually grasp the contact state, which is the state of the spreading, of each droplet for each of the plurality of droplets of the curable composition 9.

In step S008, the gas information including at least the mole of the gas trapped between the droplets of the curable composition 9 is calculated from the merging information (and the chronological change of the merging information) calculated in step S006. A method of calculating, as the gas information, the mole, that is, the quantity of the gas trapped between the droplets of the curable composition 9 will be described with reference to FIGS. 9A and 9B. In this embodiment, a quantity $V_{bub}$ of the gas trapped in a closed region formed by the droplet elements $DRP_1$, $DRP_2$, and $DRP_3$ will be calculated. FIG. 9A shows a state in which the substrate 10 is viewed from above, and FIG. 9B shows a state in which the substrate 10 has been viewed from the side along a line 901 indicated in FIG. 9A.

First, as shown in FIG. 9A, a gas area $S_{bub}$ when the gas trapped in the closed region is viewed from above is calculated. The gas area $S_{bub}$ is obtained, as follows, as a difference between a closed region area $S_{close}$, which has links LK forming the closed region as a boundary, and an area $S_{drp}$ of the droplet elements $DRP_1$, $DRP_2$, and $DRP_3$ included in the closed region.

$$S_{bub} = S_{close} - S_{drp} \tag{3}$$

Figure 9B:
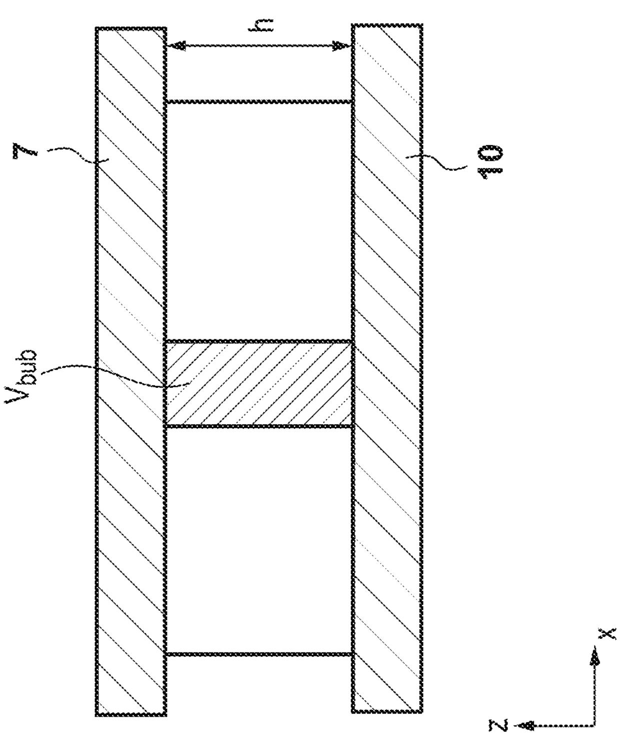
FIGS. 9A and 9B are views for describing a method of calculating the gas information of a gas trapped in a closed region.
Figure 9A:
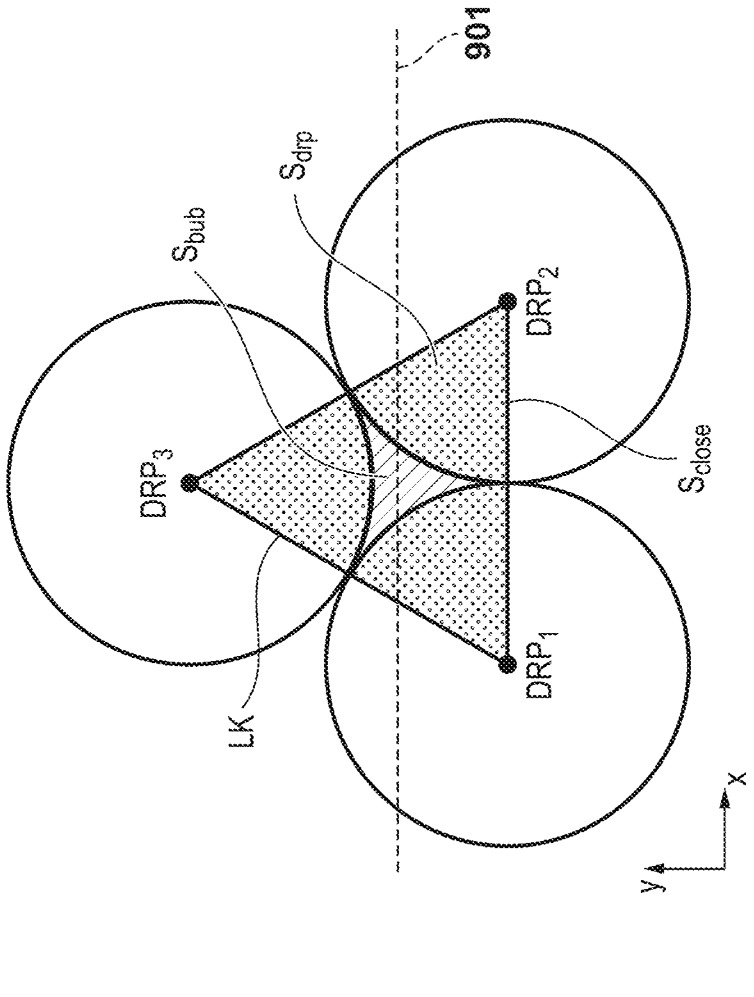

Referring to FIG. 9B, the quantity $V_{bub}$ of the gas is the quantity of the gas trapped between the mold 7, the substrate 10, and the droplets of the curable composition 9, and obtained as $$V_{bub} = S_{bub} \times h \tag{4}$$

where h is a distance (height) or a remaining film thickness between the mold 7 and the substrate 10.

Note that although the volume of the gas is calculated as the quantity of the gas trapped in the closed region in equation (4), the present invention is not limited to this. For example, as the quantity of the gas trapped in the closed region, the number $n_{bub}$ of molecules included the gas may be calculated as $$n_{bub} = \frac{P_{pub} V_{bub}}{RT} \tag{5}$$

where R is a gas constant and T is a temperature.

In this manner, the number of molecules of the gas trapped in the closed region can be obtained as a quantity which is proportional to the product of the gas pressure and the volume of air bubbles in the gas. Note that the gas pressure can be calculated as a force received by the gas due to the pressing of the mold 7.

Figure 8:
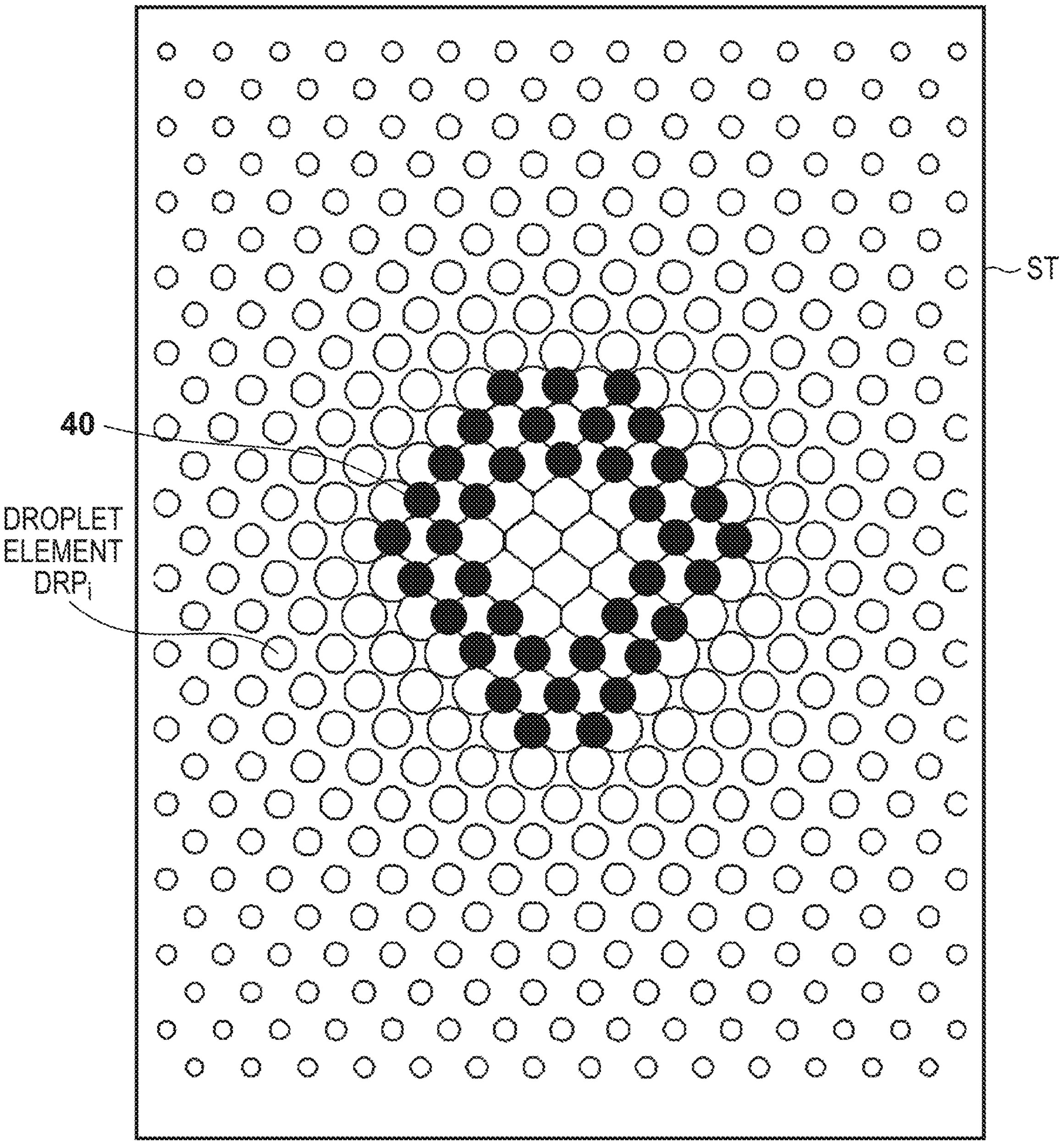
FIG. 8 is a view showing an example of an image which is to be displayed on the display.

In step S009, the gas information obtained in this manner is displayed on the display 34 together with the information indicating the state (of the spreading) of the droplets of the curable composition 9 corresponding to the gas information. FIG. 8 is a view that shows an example of an image including the gas information to be displayed on the display 34 in step S009. However, the gas information need not always be displayed together with the information indicating the state of the droplets of the curable composition 9, and it may also be arranged so that only the gas information will be displayed on the display 34. In FIG. 8, circles representing the respective quantities of the gas as pieces of gas information 40 are displayed with respect to the distribution of the droplet elements $DRP_i$ arranged on the shot region ST of the substrate 10. Furthermore, in this embodiment, the piece of gas information 40 calculated for a closed region formed by adjacent droplet elements is displayed on the display position of the closed region. Hence, each piece of gas information 40 also represents the position of the gas trapped in the closed region in the distribution of the droplet elements $DRP_i$ arranged on the shot region ST of the substrate 10. Note that in order to allow the position of the gas trapped in each closed region to be visually confirmed more easily, (the contour or the inside of) each circle representing a piece of the gas information 40 may be displayed in a specific color or may be made to blink.

Note that although this embodiment has described a case in which the image shown in FIG. 7 and the image shown in FIG. 8 are displayed independently on the display 34, the image shown in FIG. 7 and the image shown in FIG. 8 may be displayed in parallel. In addition, the merging information calculated in step S006 and the gas information calculated in step S008 may also be displayed on the display 34 together with the information indicating the state of each droplet of curable composition 9 corresponding to the merging information and the gas information.

As described above, in this embodiment, the droplet elements $DRP_i$ are spread out sequentially from each droplet element $DRP_i$ arranged at the center of the shot region ST to each droplet element $DRP_i$ arranged on the peripheral side of the shot region ST. Hence, the gas information 40 will be displayed from the center region where the mold 7 and the curable composition 9 on the substrate will be brought into contact first. As the time passes, the gas information 40 will stop being displayed in the center region, and the gas information 40 will be displayed along the peripheral region. Ultimately, as long as the arrangement of the droplets of the curable composition 9 and the method, the conditions, and the like of the pressing of the mold 7 to the curable composition 9 are appropriate and no abnormality occurs in the imprint process, the gas information 40 will stop being displayed. In other words, the entire shot region ST will be covered by the curable composition 9.

A display example of the gas information 40 included in an image to be displayed on the display 34 according to this embodiment will be described with reference to FIGS. 10A to 10D. FIGS. 10A to 10D are views each showing an example of an image including the gas information 40 to be displayed on the display 34.

Figure 10A:
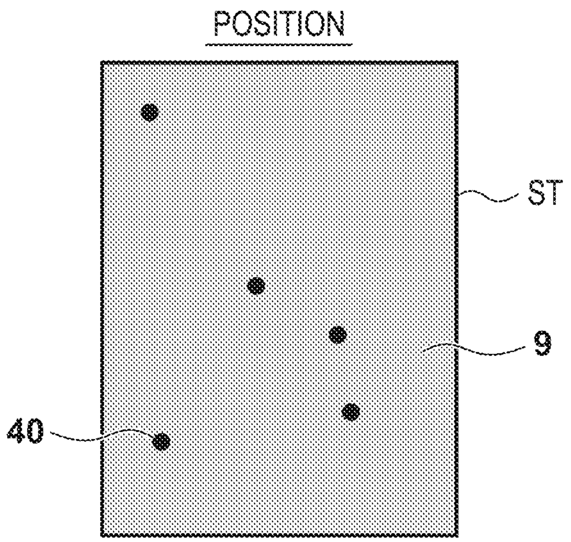
FIGS. 10A to 10D are views showing examples of images which are to be displayed on the display.
Figure 10B:
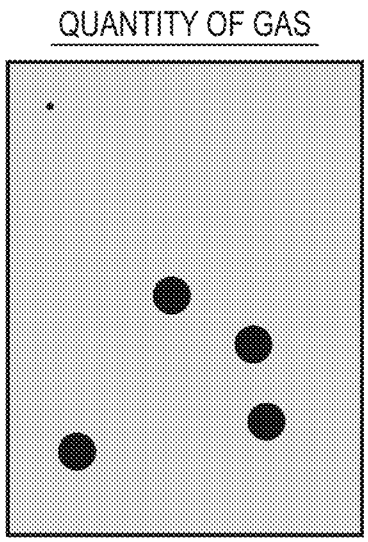

FIGS. 10A to 10D show a case in which an abnormality has occurred during the pressing process of the imprint process, and a gas has been trapped (is remaining) in closed regions formed by adjacent droplets of the curable composition 9. In FIG. 10A, each piece of the gas information 40 is displayed as a circle and displays the position of the gas trapped in a closed region. In FIG. 10B, each piece of the gas information 40 identifiably displays, in addition to the position of the gas trapped in the closed region, the magnitude of the quantity of the gas based on the size of the circle. As a result, the quantity (distribution) of the gas trapped in each closed region can be visually grasped. Note that although the quantity of the gas trapped in each closed region is displayed based on the size of the circle in FIG. 10B, the present invention is not limited to this. For example, the magnitude of the quantity of the gas may be identifiably displayed by color.

Figure 10C:
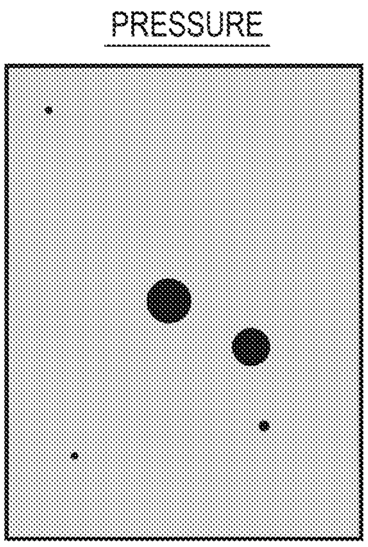
Figure 10D:
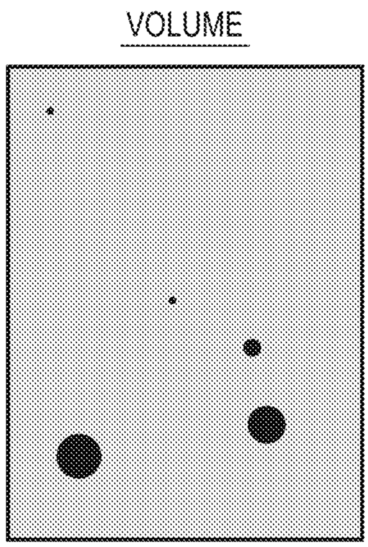

Furthermore, in FIGS. 10C and 10D, the gas information 40 identifiably displays, based on the size of the circle, the pressure the gas and the volume of the gas, respectively, in addition to the position of the gas trapped in each closed region. By referring to FIGS. 10C and 10D, it is possible to visually grasp that the pressure and the volume of the gas will vary even if the quantity of the gas trapped in each closed region is the same. For example, in the center region of the shot region ST where the mold 7 and the curable composition 9 on the substrate will be brought into contact first, the gas trapped in each closed region has a high pressure, but has a small volume. Since the gas was trapped (generated) early in each closed region and a long time has elapsed since the mold 7 and the curable composition 9 have been brought into contact, it can be considered that this has led to a decrease the volume and an increase the pressure as each droplet has spread. On the other hand, in the peripheral region of the shot region ST, since the gas was trapped late in each closed region and a short time has elapsed since the mold 7 and the curable composition 9 have been brought into contact, it can be considered that the volume of the gas has increased because each droplet has not yet spread sufficiently.

In addition, by displaying the image shown in FIG. 10C and the image shown in FIG. 10D in parallel on the display 34, it will be possible to grasp the cause of the entrapment of the gas in each closed region formed by adjacent droplets of the curable composition 9. As a result, the arrangement of the droplets of the curable composition 9 and the method, the conditions, and the like of the pressing of the mold 7 to the curable composition 9 will be able to be easily optimized (adjusted). For example, if the cause is the pressure of the gas, the force and the speed by which the mold 7 is pressed onto the curable composition 9 on the substrate will be optimized. On the other hand, if the cause is the volume of the gas, the arrangement of the droplets of the curable composition 9 will be optimized since the problem will be in the distance between the droplets of the curable composition 9.

Figure 11:
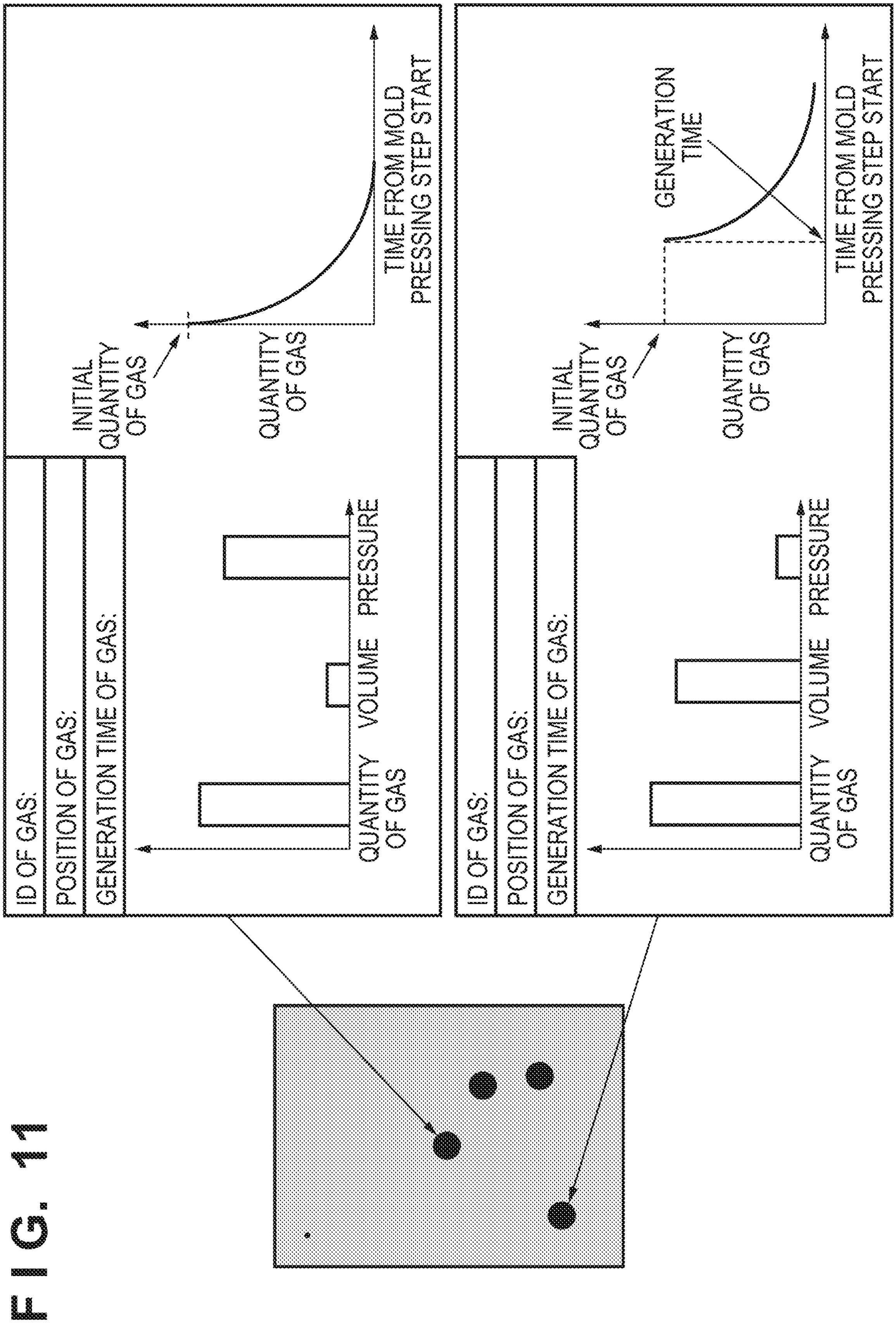
FIG. 11 is a view showing an example of an image which is to be displayed on the display.

Also, as shown in FIG. 11, it may be arranged so that the ID, the position (coordinates), the generation time, the change over time, the quantity, and the volume of the gas corresponding to a piece of the gas information 40 will be displayed when the piece of the gas information 40 on the display 34 is selected. As a result, it will be possible to easily discriminate whether the cause of the increase in the quantity of the gas trapped in a closed region formed by the adjacent droplets of the curable composition 9 is due to the pressure of the gas or the volume of the gas. Clearly grasping the cause by which the gas is trapped in each closed region will allow, as described above, the arrangement of the droplets of the curable composition 9 and the method, the conditions, and the like of the pressing of the mold 7 to the curable composition 9 to be optimized more easily.

In addition, as shown in FIG. 11, it is preferable to display the time (generation time) at which the gas is trapped in each closed region formed by the adjacent droplets of the curable composition 9 and the change in the gas information over time. By displaying at least one of the generation time and the change in the gas information over time in accordance with an instruction from a user in this manner, it will be possible to calculate the time required for the pressing process by predicting the time it will take for the gas trapped in each closed region to disappear. For example, since it will be disadvantageous in terms of productivity if the time required for the pressing process is very long, it will be necessary to optimize the arrangement of the droplets of the curable composition 9 and the method, the conditions, and the like of the pressing of the mold 7 to the curable composition 9. Note that although FIG. 11 shows the change over time in the quantity of the gas trapped in each closed region, the change in the pressure or the volume of the gas over time may also be simultaneously displayed.

In addition, a gas can be trapped in each closed region, formed by the adjacent droplets of the curable composition 9, due to the pattern of the mold 7 or the pattern arranged on the surface of the substrate 10. For example, if the pattern arranged on the mold 7 or the substrate 10 is a pattern such as a line and space pattern extending in a vertical direction, the droplets of the curable composition 9 will spread more easily in the vertical direction, but will have difficulty spreading in a horizontal direction. Also, since a large amount of curable composition 9 is required for a comparatively large pattern such as an alignment mark, the curable composition 9 tends to become insufficient in the periphery of the alignment mark, causing the gas to be trapped in each closed region. Therefore, it is preferable to overlay and display the pattern of the mold 7 or the pattern arranged on the surface of the substrate 10 on the images shown in FIG. 10A to FIG. 10D and FIG. 11. In other words, it is preferable to display, in addition to the gas information of the gas trapped in each closed region and the information indicating the state of each droplet corresponding to the gas information, at least one of the information related to the pattern arranged on the mold 7 and the information related to the pattern arranged on the substrate 10.

The calculation process including the processes of steps S003, S004, S005, S006, and S008 is executed at a plurality of times which have been preset. The plurality of times will be arbitrarily set within a period from a time at which the mold 7 starts to be lowered from an initial position until a time at which curing of the curable composition is to be performed after the mold has been brought into contact with a plurality of droplets, the plurality of droplets have spread upon being pressed, and the plurality of droplets have merged with each to ultimately form a single film. The plurality of times are typically set to have a constant time interval.

In step S010, whether the time of the calculation has reached the end time is determined. As described above, if the time of the calculation has not reached the end time, the time will be advanced to the next time to shift the process to step S003. If the time of the calculation has reached the end time, the simulation will be ended. In on example, in step S010, the current time will be advanced by only a designated amount of time and set to a new time. Subsequently, when the new time has reached the end time, the simulation will be ended.

Since this embodiment employs the photo-curing method as the curing method of the curable composition 9, the quantity of the gas obtained from equation (5) can be represented by the pressure and the volume of the gas by setting the temperature of the imprint environment to be constant. On the other hand, if the heat curing method is to be employed as the curing method of the curable composition 9, the temperature of the gas and the temperature distributions of the mold 7 and the substrate 10 can be displayed together since the temperature of the gas will be relevant.

In addition, the atmosphere of the space between the mold 7 and the substrate 10 may be replaced by a gas that has high solubility or high dispersiveness with respect to the curable composition 9 so that, for example, the gas trapped in between the droplets will be able to disappear more easily. In such a case, the type and the concentration distribution of the gas to be supplied to the space between the mold 7 and the substrate 10 may be displayed together. Note that a gas that has high solubility or high dispersiveness with respect to the curable composition 9 can include, for example, helium, carbon dioxide, pentafluoropropane, or the like.

According to this embodiment, the behavior of the plurality of droplets of the curable composition 9 arranged on the substrate 10, particularly, the gas trapped between the droplets can be visually confirmed. Hence, it will be possible to predict a location where a defect due to an unfilled portion caused by the gas trapped between the droplets will tend to be generated in the process of forming the curable composition 9 in the film forming apparatus 1. In addition, by using the simulation method and the result thereof according to this embodiment to repeatedly adjust the arrangement of the droplets of the curable composition 9 and the method, the conditions, and the like of the pressing of the mold 7 to the curable composition 9, it will be possible to set these arrangements, methods, and conditions more easily while suppressing the generation of a defect due to an unfilled portion.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The film forming apparatus 1 incorporating the simulation apparatus 30 controls, by using the simulation apparatus 30 to predict the behavior of the curable composition, the process of forming a film made of the curable composition on a first member by bringing the curable composition arranged on the first member into contact with a second member.

A method of manufacturing an article according to the embodiment includes a process of determining the conditions for the process of forming a film made of the curable composition on a first member by bringing the curable composition arranged on the first member into contact with a second member while repeatedly executing the simulation method described above, and a process of executing the process of forming in accordance with the determined conditions. Although an embodiment in which a mold includes a pattern has been described above, the present invention is also applicable to an embodiment n which a substrate includes a pattern.

Figure 12A:
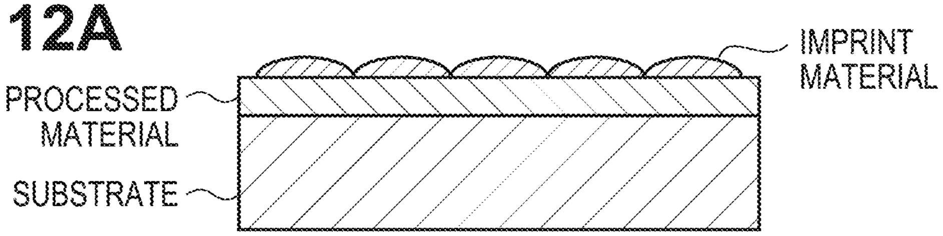
FIG. 12A to FIG. 12F are views for describing an article manufacturing method.

FIG. 12A to FIG. 12F show a more specific example of a method of manufacturing an article. As illustrated in FIG. 12A, the substrate such as a silicon wafer with a processed material such as an insulator formed on the surface is prepared. Next, an imprint material (curable composition) is applied to the surface of the processed material by an inkjet method or the like. A state in which the imprint material is applied as a plurality of droplets onto the substrate is shown here.

Figure 12B:
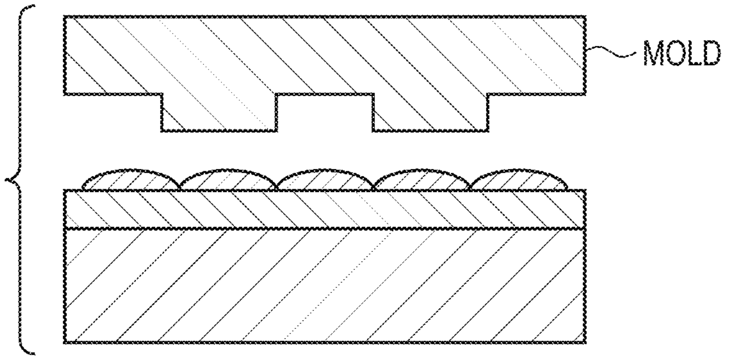
Figure 12C:
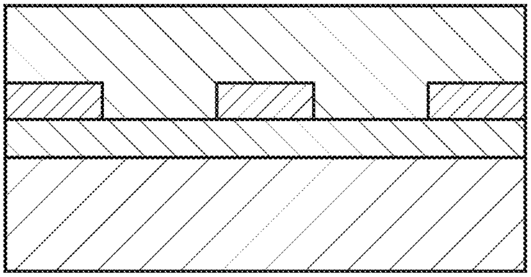

As shown in FIG. 12B, a side of the mold for imprint with a projection and groove pattern is formed on and caused to face the imprint material on the substrate. As illustrated in FIG. 12C, the substrate to which the imprint material is applied is brought into contact with the mold, and a pressure is applied. The gap between the mold and the processed material is filled with the imprint material. In this state, when the imprint material is irradiated with light serving as curing energy through the mold, the imprint material is cured.

Figure 12D:
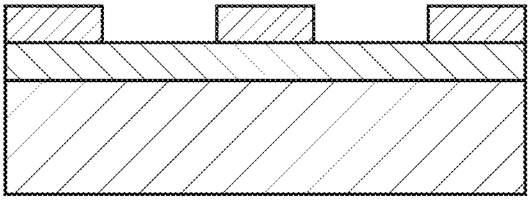

As shown in FIG. 12D, after the imprint material is cured, the mold is released from the substrate. Thus, the pattern of the cured product of the imprint material is formed on the substrate. In the pattern of the cured product, the groove of the mold corresponds to the projection of the cured product, and the projection of the mold corresponds to the groove of the cured product. That is, the projection and groove pattern of the mold is transferred to the imprint material.

Figure 12E:
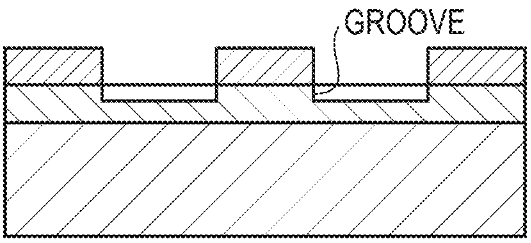
Figure 12F:
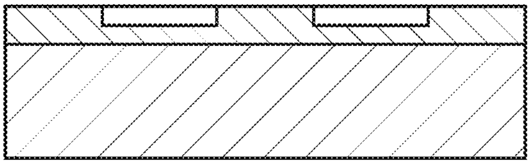

As shown in FIG. 12E, when etching is performed using the pattern of the cured product as an etching resistant mask, a portion of the surface of the processed material where the cured product does not exist or remains thin is removed to form a groove. As shown in FIG. 12F, when the pattern of the cured product is removed, an article with the grooves formed in the surface of the processed material can be obtained. The pattern of the cured material is removed here, but, for example, the pattern may be used as a film for insulation between layers included in a semiconductor element or the like without being removed after processing, in other words as a constituent member of the article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2021-022043 filed on Feb. 15, 2021, which is hereby incorporated by reference herein in its entirety.

What is claimed is:

1. A method of forming an actual film of a curable composition in a film forming apparatus that brings the curable composition arranged on a first member into contact with a second member to form the actual film of the curable composition on the first member, the method comprising:

obtaining a plurality of parameters related to the forming of the actual film of the curable composition;

obtaining, for each of a plurality of droplets of the curable composition, gas information, which includes at least a mole of a gas trapped in a closed region formed by adjacent droplets merging with each other, based on an evaluation value that quantifies a degree of merging between the adjacent droplets, the evaluation value being obtained by (i) discretizing a contour of each of the plurality of droplets into a plurality of angular positions about a representative point of each of the plurality of droplets and (ii) determining a number of the plurality of angular positions of a first droplet among the plurality of droplets that are in contact with the contour of a second droplet among the plurality of droplets;

displaying the gas information to thereby display (i) in the closed region formed by the adjacent droplets merged with each other, at least the mole of the gas trapped in the closed region together with (ii) information indicating a state of the droplet corresponding to the gas information;

obtaining at least one updated parameter of the plurality of parameters wherein the at least one updated parameter is at least one of: an arrangement of a plurality of droplets of the curable composition arranged on the first member and pressing conditions for bringing a mold into contact with the curable composition, the at least one updated parameter having been updated to suppress a predicted defect of the film indicated by the displayed gas information; and forming, by the film forming apparatus, the actual film of the curable composition by arranging the curable composition on the first member using a supplying unit of the film forming apparatus and bringing the curable composition arranged on the first member into contact with the second member using a mold driving mechanism of the film forming apparatus according to the plurality of parameters including the at least one updated parameter.

2. The method according to claim 1, wherein in the displaying, the gas information obtained in the obtaining is displayed in a display position of the closed region from which the gas information was obtained.

3. The method according to claim 1, wherein the gas information includes at least one of a volume and a pressure of the gas trapped in the closed region.

4. The method according to claim 1, wherein in the displaying, a magnitude of the mole obtained in the obtaining is identifiably displayed based on the size of a circle.

5. The method according to claim 1, wherein in the displaying, a magnitude of the mole obtained in the obtaining is identifiably displayed by color.

6. The method according to claim 1, wherein in the displaying, in accordance with an instruction from a user, at least one of a time at which the gas is trapped in the closed region and a change in the gas information over time is further displayed.

7. The method according to claim 1, wherein in the displaying, at least one of information related to a pattern arranged on the first member and information related to a pattern arranged on the second member is displayed together with the at least the mole of the gas trapped in the closed region and the information indicating the state of the droplet corresponding to the gas information.

8. The method according to claim 1, wherein the evaluation value includes, for each of the plurality of droplets of the curable composition, a ratio of a portion of a contour of a subject droplet in contact with a contour of an adjacent droplet to an entire contour of the subject droplet.

9. An apparatus that forms an actual film of a curable composition by bringing the curable composition arranged on a first member into contact with a second member to form the actual film of the curable composition on the first member, the apparatus comprising:

one or more memories; and one or more processors configured to execute the instructions in the one or more memories to:

obtain a plurality of parameters related to the forming of the actual film of the curable composition;

obtain, for each of a plurality of droplets of the curable composition, gas information, which includes at least a mole of a gas trapped in a closed region formed by adjacent droplets merging with each other, based on an evaluation value that quantifies a degree of merging between the adjacent droplets, the evaluation value being obtained by (i) discretizing a contour of each of the plurality of droplets into a plurality of angular positions about a representative point of each of the plurality of droplets and (ii) determining a number of the plurality of angular positions of a first droplet among the plurality of droplets that are in contact with the contour of a second droplet among the plurality of droplets;

display the obtained gas information to thereby display (i) in the closed region formed by the adjacent droplets merged with each other, at least the mole of the gas trapped in the closed region together with (ii) information indicating a state of the droplet corresponding to the gas information;

obtain at least one updated parameter of the plurality of parameters wherein the at least one updated parameter is at least one of: an arrangement of a plurality of droplets of the curable composition arranged on the first member and pressing conditions for bringing a mold into contact with the curable composition, the at least one updated parameter having been updated to suppress a predicted defect of the film indicated by the displayed gas information; and forming, by the apparatus, the actual film of the curable composition by arranging the curable composition on the first member using a supplying unit of the apparatus and bringing the curable composition arranged on the first member into contact with the second member using a mold driving mechanism of the apparatus according to the plurality of parameters including the at least one updated parameter.

10. An article manufacturing method comprising:

executing the method of claim 1; and manufacturing the article, the article including the actual film of the curable composition.

11. A non-transitory storage medium storing a program for causing a computer to execute the method defined in claim 1.

12. The method according to claim 1, further comprising displaying, in response to a user selection of the gas information being displayed, at least one of an amount, a pressure, and a volume of gas corresponding to the selected gas information in a graph.

* * * * *